(12) United States Patent
Vignolo et al.

(10) Patent No.: US 11,391,631 B2
(45) Date of Patent: Jul. 19, 2022

(54) METHOD AND SYSTEM FOR DETERMINING A PLURALITY OF COLOUR QUALITY INDICATORS FOR A COLOUR CONTROL OF A PAINT

(71) Applicant: BASF Coatings GmbH, Münster (DE)

(72) Inventors: Carlos Vignolo, Wuerzburg (DE); Florian Steufmehl, Muenster (DE)

(73) Assignee: BASF Coatings GmbH, Münster (DE)

( * ) Notice: Subject to any disclaimer, the term of this patent is extended or adjusted under 35 U.S.C. 154(b) by 151 days.

(21) Appl. No.: 16/753,483

(22) PCT Filed: Oct. 4, 2018

(86) PCT No.: PCT/EP2018/077048
§ 371 (c)(1),
(2) Date: Apr. 3, 2020

(87) PCT Pub. No.: WO2019/068828
PCT Pub. Date: Apr. 11, 2019

(65) Prior Publication Data
US 2021/0404876 A1 Dec. 30, 2021

(30) Foreign Application Priority Data
Oct. 5, 2017 (EP) .................................... 17195024

(51) Int. Cl.
*G01J 3/46* (2006.01)
*G01J 3/10* (2006.01)
*G01J 3/50* (2006.01)

(52) U.S. Cl.
CPC ................. *G01J 3/463* (2013.01); *G01J 3/10* (2013.01); *G01J 3/504* (2013.01); *G01J 2003/102* (2013.01)

(58) Field of Classification Search
None
See application file for complete search history.

(56) References Cited

U.S. PATENT DOCUMENTS 4,439,038 A * 3/1984 Mactaggart ............... G01J 3/50
356/408
4,917,495 A * 4/1990 Steenhoek ............ G01J 3/0251
356/328

(Continued)

FOREIGN PATENT DOCUMENTS

DE 10208696 A1 9/2002
WO 2013049796 A1 4/2013
WO 2016074801 A2 5/2016

OTHER PUBLICATIONS

English translation of International Search Report for International Application No. PCT/EP2018/077048, dated Jan. 8, 2019, 2 pages.

(Continued)

*Primary Examiner* — Shawn Decenzo
(74) *Attorney, Agent, or Firm* — Armstrong Teasdale LLP (57) ABSTRACT

Disclosed is a process for determining a plurality of color quality indicators for controlling the color of a coating. Colorimetric coordinates of a color reference and the coating are ascertained for a plurality of coated surface elements using a spectrophotometer at a number of measurement geometries and a number of light sources. For each measurement geometry and each light source, color differences are calculated from the colorimetric coordinates of the color reference and the coating of the plurality of coated surface elements. The respective colorimetric coordinates are normalized with one weighting factor. Each of the plurality of color quality indicators is determined by means of a mapping, of functional values onto a scale value of a predetermined scale. The functional values are determined in each case for the number of measurement geometries and the number of light sources by means of a mathematical relationship.

16 Claims, 2 Drawing Sheets

(56) References Cited

U.S. PATENT DOCUMENTS

| | | | |
|---|---|---|---|
| 6,750,970 B2 | 6/2004 | Masuda | |
| 11,035,733 B2* | 6/2021 | Tamal | H04N 1/6033 |
| 2011/0013176 A1* | 1/2011 | Schwarz | G01B 11/0608 |
| | | | 356/73 |
| 2011/0160892 A1* | 6/2011 | Kettler | G01J 3/46 |
| | | | 700/105 |
| 2014/0242271 A1* | 8/2014 | Prakash | B60S 5/00 |
| | | | 427/140 |
| 2016/0005187 A1* | 1/2016 | Prakash | G06T 7/90 |
| | | | 356/402 |
| 2017/0328774 A1* | 11/2017 | Vignolo | G01J 3/50 |

OTHER PUBLICATIONS

PPG "Bumper color", Aug. 22, 2011, Retrieved from the Internet Apr. 6, 2018: http://www.benspaintsupply.com/wp-contenUuploads/2011/05/matchingbumpercolors.pdf.

* cited by examiner

Fig. 1

| Q | | |
|---|---|---|
| 1 | $<d\bar{E}>sum(25\text{-}75) >= 12$ | $<d\bar{E}>25, 45, 75 >= 6$ | $max<d\bar{E}>(CIE94, 45) >= 6$ |
| 2 | $<d\bar{E}>sum(25\text{-}75) < 12$ | $<d\bar{E}>25, 45, 75 < 6$ | $max<d\bar{E}>(CIE94, 45) < 6$ |
| 3 | $<d\bar{E}>sum(25\text{-}75) < 10$ | $<d\bar{E}>25, 45, 75 < 4.5$ | $max<d\bar{E}>(CIE94, 45) < 4.5$ |
| 4 | $<d\bar{E}>sum(25\text{-}75) < 6$ | $<d\bar{E}>25, 45, 75 < 3$ | $max<d\bar{E}>(CIE94, 45) < 3$ |
| 5 | $<d\bar{E}>sum(25\text{-}75) < 3.9$ | $<d\bar{E}>25, 45, 75 < 2$ | $max<d\bar{E}>(CIE94, 45) < 2$ |
| 6 | $<d\bar{E}>sum(15\text{-}110) < 6.5$ | $<d\bar{E}>15, 25, 45, 75, 110 < 2$ | |
| 7 | | $<d\bar{E}>15, 25, 45, 75, 110 < 1.73$ | $<d\bar{S}>15, 45, 75 < 1.73$ | $<d\bar{G}> < 1.73$ | $max<d\bar{E}>(CIE94, 45) < 1.7$ |
| 8 | | $<d\bar{E}>15, 15, 25, 45, 75, 110 < 1.41$ | $<d\bar{S}>15, 45, 75 < 1.41$ | $<d\bar{G}> < 1.41$ | $max<d\bar{E}>(CIE94, 45) < 1.4$ |
|   |   |   |   |   | $max<d\bar{E}>(CIE94, 45) < 1.0$ |

Fig. 2

METHOD AND SYSTEM FOR DETERMINING A PLURALITY OF COLOUR QUALITY INDICATORS FOR A COLOUR CONTROL OF A PAINT

CROSS-REFERENCE TO RELATED APPLICATIONS

This application is a U.S. National Phase Application of PCT/EP2018/077048, filed Oct. 4, 2018, which claims the benefit of priority to EP Application No. 17195024.9, filed Oct. 5, 2017, the contents of which are hereby expressly incorporated by reference in their entirety.

The present invention relates to a process and a system for determining a plurality of color quality indicators for controlling the color of a coating batch on the basis of series coatings, in particular of vehicle bodies and car body attachments.

During a hue adjustment, various color-imparting components are added to a coating and said coating is subsequently compared to a color reference (hue template). To this end, the mixed coating is conventionally measured spectrophotometrically and measurement values ascertained thereby, i.e., for example, colorimetric coordinates, are compared to corresponding measurement values of the color reference. Particularly in the case of effect coatings, which comprise a number of effect pigments, a meaningful comparison between a respective effect coating and a respective color reference only is possible using measurement values that are ascertained under various measurement geometries. This means that a multiplicity of measurement values for a multiplicity of measurement geometries and, possibly, for a plurality of light sources or light types must be ascertained in order to compare a coating with a color reference.

The prior art has disclosed processes which provide a restricted comparison between a respective coating and a respective hue template, i.e. color reference, without considering possibly present effect pigments for only three measurement geometries.

The document WO 2013/049796 A1 relates to a process for comparing a coating with a reference, with color characteristics of a color formula being used as a reference.

The document DE 102 08 696 A1 discloses a process in which colors that approximate a metallic color are calculated by means of color classification codes.

The document US 2011/013176 A1 discloses a process for ascertaining properties of a surface.

WO 2016/074801 A2 has disclosed the practice of ascertaining a characteristic Q which facilitates an assessment of a correspondence of a coating with a color reference on the basis of a scale. However, on the basis of the aforementioned characteristic Q, it is not immediately possible to derive the behavior of the coating upon application of same on different surfaces.

By way of example, if the coating is applied, for example, onto a surface of a vehicle body, onto a surface of a vehicle attachment such as, for example, a bumper, and onto corresponding control plates, for example of the coating producer, the external appearance of the coating on the various surfaces coated with the coating may vary by all means, i.e. the coating may exhibit different behavior from surface to surface. Now, it would be desirable to be able to provide specifications in respect of the quality of the coating, in particular of the coating of a batch, which specifications are manageable in such a scenario and usable for comparison purposes.

Against this background, it is an object of the invention to provide a process and a system which each facilitate a quick and simple assessment of a color quality of a coating upon application of same onto various surfaces.

In order to achieve the object, a process and a system for determining a plurality of different color quality indicators for controlling the color of a coating, in particular a coating batch, having the features of the independent patent claims are provided. Configurations of the process according to the invention or the system according to the invention can be gathered from the corresponding dependent claims and the description.

The object stated above is achieved by the subject matter of the independent claims.

In particular, the object stated above is achieved by virtue of, initially, colorimetric coordinates of a color reference and colorimetric coordinates of the coating, in particular of a coating batch, being ascertained for a plurality of different surface elements coated with the coating and control surface elements coated with the coating, in each case with a spectrophotometer for a number of measurement geometries and a number of light sources. Proceeding therefrom, for each measurement geometry of the number of measurement geometries and each light source of the number of light sources, respective color differences are calculated from the colorimetric coordinates of the color reference and the respective colorimetric coordinates of the coating for the plurality of the surface elements and control surface elements coated with the coating. The respective colorimetric coordinates are normalized with respectively one weighting factor. Ultimately, each of the plurality of color quality indicators is determined by means of a mapping, defined by a predetermined mapping prescription which is identical for the color quality indicators, of functional values onto a value of a predetermined scale which is identical for all color quality indicators, said functional values being calculated in each case for the number of measurement geometries and the number of light sources by means of a mathematical relationship, specific to the respective color quality indicator, between color differences of at least one of the surface elements (in relation to the color reference).

The mathematical relationship for at least one of the plurality of color quality indicators corresponds to a mathematical relationship between color differences in relation to the color reference of at least one of the surface elements and one of the control surface elements.

The predetermined scale is identical for all color quality indicators and extends over integer numerical values from 1 to 8 or Q1 to Q8, wherein 1 or Q1 represents the worst gradation and 8 or Q8 accordingly represents the best gradation of the coating in respect of a characteristic quality of the coating for a respective color quality indicator. As an alternative thereto, it is also possible that each color quality indicator is assigned a scale specific to the respective color quality indicator. The predetermined mapping prescription is identical for at least a subset of the plurality of color quality indicators and therefore overarches the color quality indicators, with the subset comprising more than one color quality indicator.

Within the scope of the present disclosure, a surface element does not denote an individual coated surface but a group of the same or similar surfaces coated with the coating. Accordingly, surfaces of parts of a product, in particular of car body parts of a vehicle body, coated with the coating should be subsumed e.g. by a first surface element and surfaces of attachments for the product, in particular car body attachments of a specific type, such as e.g. a bumper, coated with the coating should be subsumed by a second surface element. Below, a surface element representing parts of a product, in particular car body parts of a vehicle body or the surfaces thereof, is denoted by OEM and a surface element representing attachments for the product, in particular car body attachments of a specific type, is denoted by ASP.

Within the scope of the present disclosure, a control surface element denotes a control plate, for example of a producer of a coating, for parts of a product, in particular for car body parts or an attachment of the product, in particular for a car body attachment. A control surface element for parts of a product, in particular of a vehicle body, is abbreviated OEM_QC below and a control surface element for an attachment of the product, in particular for a car body attachment, is abbreviated ASP_QC.

A distinction between various surface elements is required since the various surfaces or parts represented by the respective various surface elements are coated, as a rule, at different coating stations and, moreover, often have a different nature and consequently also a different substrate on which the coating is to be applied or is applied. The specifically mentioned and described surface elements OEM, ASP, or control surface elements OEM_QC and ASP_QC represent surfaces that differ in terms of structure and coating conditions which were coated with the coating of a batch, said surfaces being able to be ordered, depending on structure and depending on coating conditions, into respective groups that can be represented by a respective surface element or a respective control surface element. Here, coating conditions relate to a specific coating station and further conditions such as temperature, humidity, etc., which are prevalent when the coating is performed.

A number of measurement geometries comprises at least one measurement geometry. A number of light sources comprises at least one light source. The terms "light source" and "light type" are used synonymously within the scope of the present disclosure.

Within the context of the presented process, a measurement geometry should be understood to mean a measurement arrangement with a certain illumination angle and a measurement instrument, such as e.g. a spectrophotometer, in particular a multi-angle spectrophotometer, arranged at a certain angle or measurement angle in relation to a surface element or control surface element coated with a respective coating.

Within the context of the present invention, colorimetric coordinates should be understood to mean coordinates in a color space for describing a color or grayscale value, in particular in an L*a*b* color space or in an L*C*H* color space.

Within the context of the present invention, a color difference should be understood to mean a difference between two colors in a color space, in particular an L*a*b* color space or an L*C*H* color space.

The L*C*H* color space corresponds to the L*a*b* color space, with the exception that cylinder coordinates C* for chroma and H* for chroma angle are used in place of Cartesian coordinates a* and b*. Here, a lightness (L*) remains unchanged.

In order to compare a respective coating with a color reference, such as e.g. a further coating, WO 2016/074801 A2 has disclosed that, as already mentioned above, a characteristic Q is determined or calculated, said characteristic facilitating or specifying a comparison or a quality value of a correspondence of the respective coating, i.e., for example, an effect coating or a solid color coating, with the respective color reference on a scale, such as e.g. a school grading scale from 1 to 8 or Q1 to Q8. However, in relation to the quality of the coating, WO 2016/074801 A2, does not consider different surface elements coated with the coating.

In order to determine the characteristic Q, provision is made, as in the process according to the invention as well, for respective colorimetric coordinates or color coordinates, which are e.g. specified in the L*a*b* color space, to be ascertained for both the respective coating and for the respective color reference in different measurement geometries and/or using various light types and/or light sources, for example using a spectrophotometer. On the basis of the color coordinates ascertained for the respective coating or the respective color reference, it is possible to calculate a corresponding color difference between the respective coating and the respective color reference for achromatic colors according to the formula (1) and for chromatic colors according to the formula (2) for each measurement geometry, i.e. for each measurement angle and/or for each light type and/or for each light source, as is also provided according to the invention.

$$dE_{Lab}^{*2} = dL^{*2} + da^{*2} + db^{*2} \tag{1}$$

with $$dL^* = L_S^* - L_R^*$$

$$da^* = a_S^* - a_R^*$$

$$db^* = b_S^* - b_R^*$$

where "R" represents reference and "S" represents a sample and therefore stands in place for the respective surface elements OEM, ASP, or control surface elements OEM_QC, ASP_QC.

$$dE_{LCH}^{*2} = dL^{*2} + dC^{*2} + dH^{*2} \tag{2}$$

A distinction between chromatic and achromatic colors can be determined, for example, pursuant to DIN 6175-2. Further, provision is made for the respective measured color coordinates to be normalized in formulas (1) and (2):

$$<dE_{Lab}> = \sqrt{<dL^*>^2 + <da^*>^2 + <db^*>^2} \tag{3}$$

$$<dE_{LCH}> = \sqrt{<dL^*>^2 + <dC^*>^2 + <dH^*>^2} \tag{4}$$

In order to normalize the respective measured color coordinates, use can be made of, for example, formula (5).

$$<dX^*> = \frac{dX^*}{S_x} \tag{5}$$

In formula (5), a normalized value $<dX^*>$ is calculated by dividing a respective value $dX^*$, i.e., in particular, a value of a respective variable of a color difference, by a respective angle-specific tolerance $S_x$. This means that the following applies:

$$<dL^*> = \frac{dL^*}{S_L}; <da^*> = \frac{da^*}{S_a}; <db^*> = \frac{db^*}{S_b}; <dC^*> = \frac{dC^*}{S_C}; <dH^*> = \frac{dH^*}{S_H}, \tag{6}$$

where the tolerance values or normalization factors $S_L$, $S_a$, $S_b$, $S_C$, $S_H$ may depend on the color, the measurement angle, a nature of the respective surface element or control surface element, i.e. of the respective substrate, on which the coating is applied, etc.

Here, a normalization may be performed according to, for example, system of equations (7).

$$S_L = S_a = S_b = 1/3$$

$$S_C = (1 + 0.048 \cdot C_R^*)/3$$

$$S_h = (1 + 0.014 \cdot C_R^*)/3 \quad (7)$$

where $C_R^*$ denotes the chroma or saturation of a color reference R in the L*a*b* color space and it should be calculated by means of the equation $C_R^* = \sqrt{(a_R^*)^2 + (b_R^*)^2}$, where the index "R" indicates the color reference R.

The determined color differences or the normalized determined color differences between the respective surface elements coated with the coating or the respective control surface elements coated with the coating and the color reference for the various measurement geometries and/or the various light types or the various light sources are now used, according to the invention, to analyze a behavior of the coating after the application thereof on the various surface elements. Here, for determining a respective color quality indicator, the calculated color differences of respectively at least one of the different surface elements and the color reference are related to one another in a manner specific for the respective color quality indicator. "Relating to one another" in this case means that the respective color differences are inserted as variables into a mathematical operation specific to the respective color quality indicator or inserted into a mathematical relationship, such as e.g. a subtraction, which is specific to the respective color quality indicator, i.e. they are brought into a mathematical relationship with one another. Respective functional value arising for the number of measurement geometries and the number of light sources during the operation are thereupon assigned to a scale value of the scale predetermined according to the invention by way of a mapping that is defined by the predetermined mapping prescription. This scale value then corresponds to the respective color quality indicator or the value thereof for the specific coating. The assignment of the functional values to a scale value is performed by virtue of, initially, a functional value being calculated according to the respective color-quality-indicator-specific mathematical relationship for each measurement geometry and light source and then the functional values for the number of measurement geometries and the number of light sources being linked to one another, for example by forming a sum and/or by forming a mean value and/or by finding the maximum value, and the operations realized thus having to meet specific conditions characteristic for each scale value according to the predetermined mapping prescription in order to be assigned to the respective scale value.

Here, color differences respectively ascertained separately for each measurement geometry and/or each light source are incorporated into the mathematical operation provided for the respective color quality indicator, said color differences having been determined for the at least one surface element or control surface element to be taken into account in the respective color quality indicator. The color quality indicators LPI, BPI and API, which will still be explained in more detail below, are calculated individually and separately for OEM and ASP.

In order to take account of respective effect properties of an effect coating in the process according to the invention, provision is made for sparkle differences and graininess differences, measured using a gonio-effect-spectrophotometer, to be taken into account, respectively in relation to the color reference. To this end, respective values of the sparkle differences or the graininess differences measured by the gonio-effect-spectrophotometer are normalized, for example according to equation (5), and inserted into the color-quality-indicator-specific mathematical relationship as variable <dX> in addition to the color differences per measurement geometry and light source for calculating further functional values and taken into account during the assignment of respective calculated functional values of the respective color quality indicator to a scale value according to the mapping prescription to be provided in advance.

For the purposes of assigning respective functional values, measured under various measurement geometries, to a respective scale value of the respective color quality indicator, provision is made for color differences and/or sparkle differences and/or graininess differences, calculated and normalized for an effect coating for respective measurement geometries, to be combined by calculation by a function, i.e. the color-quality-indicator-specific mathematical relationship, and for the result of such a calculation by calculation to be assigned to a discrete scale value of the respective color quality indicator, optionally using further conditions, on the basis of a mapping or assignment rule "rating" defined by the predetermined mapping prescription which is identical for all color quality indicators, which, for example, regulates intervals between respective scale values. This means that color differences are combined by calculation according to the function, sparkle differences are optionally additionally combined by calculation according to the function, graininess differences further are optionally additionally combined by calculation according to the function, and the functional values obtained thus are assigned to a scale value according to the predetermined mapping prescription "rating".

The predetermined mapping prescription which is identical for all color quality indicators defines a scale-value-specific mapping (see table in FIG. 2) or a scale-value-specific condition, which should be satisfied by the previously determined functional values, i.e. in each case by the respective color-quality-indicator-specific functional values, in order to assign to the respective color quality indicator for the coating in question for which the color control is to be performed, the respective corresponding scale value, for each scale value or for a respective assignment to a scale value.

Furthermore, in the case where the coating is a so-called solid coating, provision is made for color differences of only one measurement geometry, which were ascertained under at least two different light types or light sources, to be combined by calculation by the function. A distinction between solid coatings and effect coatings can be determined, for example, pursuant to DIN 6175-1. On the basis of the color differences combined by calculation, a respective solid coating can be assigned to a respective scale value of the respective color quality indicator according to the predetermined mapping prescription.

In a possible configuration, the plurality of surface elements coated with the coating at least comprise: a coated surface element OEM of a part of a product, in particular a surface element OEM of a vehicle body coated by a e.g. car body maker, a coated surface element ASP of an attachment for the product, in particular a surface element ASP of a car body attachment coated with the coating by a e.g. vehicle supplier, made of plastic in particular, and the plurality of control surface elements coated with the coating comprises at least: a control surface element OEM_QC for the product, in particular the vehicle body, coated by a producer of the coating, a control surface element ASP_QC for the product attachment, in particular the car body attachment, coated by the producer of the coating, made of plastic in particular.

A surface element OEM of a vehicle body coated by a car body maker and a surface element ASP of a car body attachment coated by a vehicle supplier are respectively also referred to below as a surface element from a production line. What this should express is that these surface elements are coated within the scope of a production process of a respective vehicle at work or coating stations provided to this end. Here, the coating stations for the surface elements of a vehicle body and those for the surface elements of a car body attachment are, as a rule, independent and separate from one another.

In general, OEM denotes "original equipment manufacturer", but it is used here, in particular, for denoting a surface element of a product coated by the OEM with the coating, in particular a surface element of a vehicle body coated by e.g. the car body maker, wherein here, as explained above, this refers to all surfaces of product parts coated by the coating, in particular car body parts of a vehicle body, which are measured.

Generally, ASP denotes "automotive supplier plastics", but it is used here, in particular, for denoting a product attachment coated with the coating, in particular a car body attachment coated with the coating, which, in particular, is made of plastic and by, for example, a vehicle supplier, wherein, here too, this refers to all surfaces of product attachments, in particular car body attachments of a specific type or specific origin or specific vehicle supplier, coated with the coating.

Here, QC represents "quality control".

The respective colorimetric coordinates are determined in each case on the basis of respective reflection values of the color reference and the plurality of coated surface elements or control surface elements. Here, a respective reflection value is determined for a respective measurement geometry and a respective light source for each of the plurality of surface elements or control surface elements coated with the coating:

$$R(\text{Ref})\Phi \rightarrow (L^*, a^*, b^*)_{\Phi, l, Ref}$$

$$R(\text{OEM})\Phi, i \rightarrow (L^*, a^*, b^*)_{\Phi, l, i, OEM}$$

$$R(\text{ASP})_{\Phi, j} \rightarrow (L^*, a^*, b^*)_{\Phi, l, j, ASP}$$

$$R(\text{OEM\_QC})_\Phi \rightarrow (L^*, a^*, b^*)_{\Phi, l, OEM\_QC}$$

$$R(\text{ASP\_QC})_\Phi \rightarrow (L^*, a^*, b^*)_{\Phi, l, ASP\_QC} \quad (8)$$

where R specifies the respective reflection value, $\Phi$ represents a respective measurement geometry, l represents a respective light source, Ref denotes the color reference, OEM denotes a product part, in particular a surface element of a vehicle body coated by e.g. a car body maker, ASP denotes a product attachment, in particular a surface element of a car body attachment coated by e.g. a vehicle supplier, said car body attachment being made, in particular, of plastic, OEM_QC denotes a control surface element for the product, in particular the vehicle body, coated by a producer of the coating and ASP_QC denotes a control surface element for the product attachment, in particular the car body attachment, coated by the producer of the coating. The respective parts which comprise the surface elements coated with the coating are denoted by i, j, where i denotes the product or the car body and j denotes the product attachment or the car body attachment, such as e.g. a bumper. If, for example, the number of measurement geometries is x, where x is a positive integer, and y denotes the number of light sources, where y is a positive integer, then x times y, i.e. x*y, reflection values emerge for each surface element or control surface element, i.e. for each coated surface represented by the surface element or control surface element and, accordingly, x times y colorimetric coordinate tuples emerge therefrom in a respective color space.

In a possible configuration of the process according to the invention, the number of measurement geometries at least comprises: respectively one measurement arrangement with a 45° illumination and a measurement angle selected from: −15°, 15°, 25°, 45°, 75° and 110° and/or respectively one measurement arrangement with a measurement angle of 90° and an illumination at an illumination angle selected from: 15°, 45°, 75° illumination and diffuse illumination.

Thereupon, according to the invention, respective color differences of the colorimetric coordinates of the color reference from the respective colorimetric coordinates of the coating are calculated in a second step for the plurality of surface elements or control surface elements coated with the coating for each measurement geometry of the number of measurement geometries and for each light source of the number of light sources:

$$dE^*_i = f(dL^*, da^*, db^*, dC^*, dH^*)_{\Phi, l, i, OEM}$$

$$dE^*_j = f(dL^*, da^*, db^*, dC^*, dH^*)_{\Phi, l, j, Asp}$$

$$dE^*\text{OEM\_Qc} = f(dL^*, da^*, db^*, dC^*, dH^*)_{\Phi, l, OEM\_QC}$$

$$dE^*_{ASP\_QC} = f(dL^*, da^*, db^*, dC^*, dH^*)_{\Phi, l, ASP\_QC} \quad (9)$$

This means that, accordingly, x*y color differences emerge for each surface element or for each coated surface represented by the surface element or control surface element in the case of x*y reflection values. The color differences are calculated individually but by using the same formula for each measurement geometry and light source. Depending on the color space, equation (3) or equation (4) is used in this case.

According to a further embodiment of the process according to the invention, the respective color differences are normalized for two different tolerance values, wherein a first tolerance value is determined for a series of surface elements coated with the coating of one batch (=series tolerance) and a second tolerance value is fixedly predetermined as a batch tolerance for the batch of the coating (=batch tolerance).

Determining the series tolerance, i.e., the tolerance value relating to the embodiment of a respective paint job with the coating, is implemented on the basis of the batch tolerance, which is fixedly predetermined for the batch or a delivery of the coating. Here, the series tolerance emerges from the batch tolerance multiplied by values of factors g, wherein, depending on the selected color space, the batch tolerance or the angle-specific tolerance $S_x$ of equation (5) should be multiplied by a $g_L$, $g_a$, $g_b$, $g_C$ and $g_H$, respectively. Here, the following applies: $g_L=2.0$, $g_a=1.2$, $g_b=1.2$, $g_C=1.8$ and $g_H=1.2$. Here, reference is made to the DIN 6175-2 standard, edition March 2001, and table 2 stored therein, in the chapter "Color tolerances for vehicle coatings, part 2: effect coatings".

Here, a series of surfaces coated with a coating of one batch comprises all of the surfaces of a respective surface element which are coated with the coating of one batch within a continuous coating process.

In a further configuration, the surfaces, coated with the coating of one batch, of a respective surface element of the series whose respective color differences are respectively greater than the first tolerance value, i.e. the series tolerance, are counted out in a further step. A CPI (general color performance indicator) series color quality indicator is determined on the basis of the counted-out number of surfaces, wherein the counted-out number of surfaces or the percentage thereof of the overall number of the surfaces, coated with the coating of the batch, from the series is assigned to a value of the scale according to a predetermined assignment prescription, wherein the scale value specifies the value of the series color quality indicator CPI. Here, the scale value lies in an interval from 1 to 8 or Q1 to Q8, wherein the scale value 1 represents the worst evaluation and the scale value 8 represents the best evaluation. The following table shows a respective mapping or assignment to a scale value.

Here, a respective color difference <dE> determined for a respective measurement geometry and light source is normalized with respect to the first tolerance value or the series tolerance ("seriestol"). If the determined color difference $<dE>_{\_seriestol} > 1.7$, for only one measurement geometry, the measured surface of the respective surface element overall is considered to be not in order ("n.i.o."). Here, V denotes the percentage of the surfaces of the respective surface element that are not in order in relation to the overall number of measured surfaces of the surface element of the series. Depending on the value of V, a scale value of Q1 to Q8 is assigned to the measured surfaces of the series or the respective series.

Definitions n.i.o.=Individual measurement with $<dE>_{\_seriestol} > 1.7$ for a measurement geometry V=100×number n.i.o./overall number of measurements (no purging of outliers; all measurements considered)

| | |
|---|---|
| Q1 | V ≥ 70 |
| Q2 | 60 ≤ V < 70 |
| Q3 | 50 ≤ V < 60 |
| Q4 | 40 ≤ V < 50 |
| Q5 | 30 ≤ V < 40 |
| Q6 | 20 ≤ V < 30 |
| Q7 | 10 ≤ V < 20 |
| Q8 | 10 > V |

According to a further embodiment of the process according to the invention, a predetermined statistical analysis process is performed on respective color differences determined for a series of surfaces of respective surface elements coated with the coating of one batch. Here, outliers are removed and purged respective color differences are provided. By way of example, this is a process for multivariate outlier purging.

As a result, it is possible to remove noise, which arises, for example, during a mixing phase of two batches of the coating or on account of further inexplicable circumstances, from the measurements. If each measurement or each surface in which at least one measurement geometry was identified as an outlier is eliminated, a new set of purged color differences is obtained:

$$dE^*_{iP} = (dL^*, da^*, db^*, dC^*, dH^*)_{\Phi, l, i, OEM, (purged)} \quad (10)$$

$$dE^*_{jP} = (dL^*, da^*, db^*, dC^*, dH^*)_{\Phi, l, j, ASP, (purged)}$$

where "P" represents "purged".

A surface element, such as e.g. a surface element OEM, denotes not a single surface, for example of a vehicle body, but a group of similar surfaces coated with the coating of a batch, as already explained above.

In a further step, the determined and purged color differences, which have been normalized by the batch tolerance, are used to determine the quality of the coating or of the coating batch in one-dimensional quality levels on the basis of the scale. Here, a distinction is made between different color quality indicators, which are respectively determined on the basis of different mathematical operations or mathematical relationships.

Figure 2:
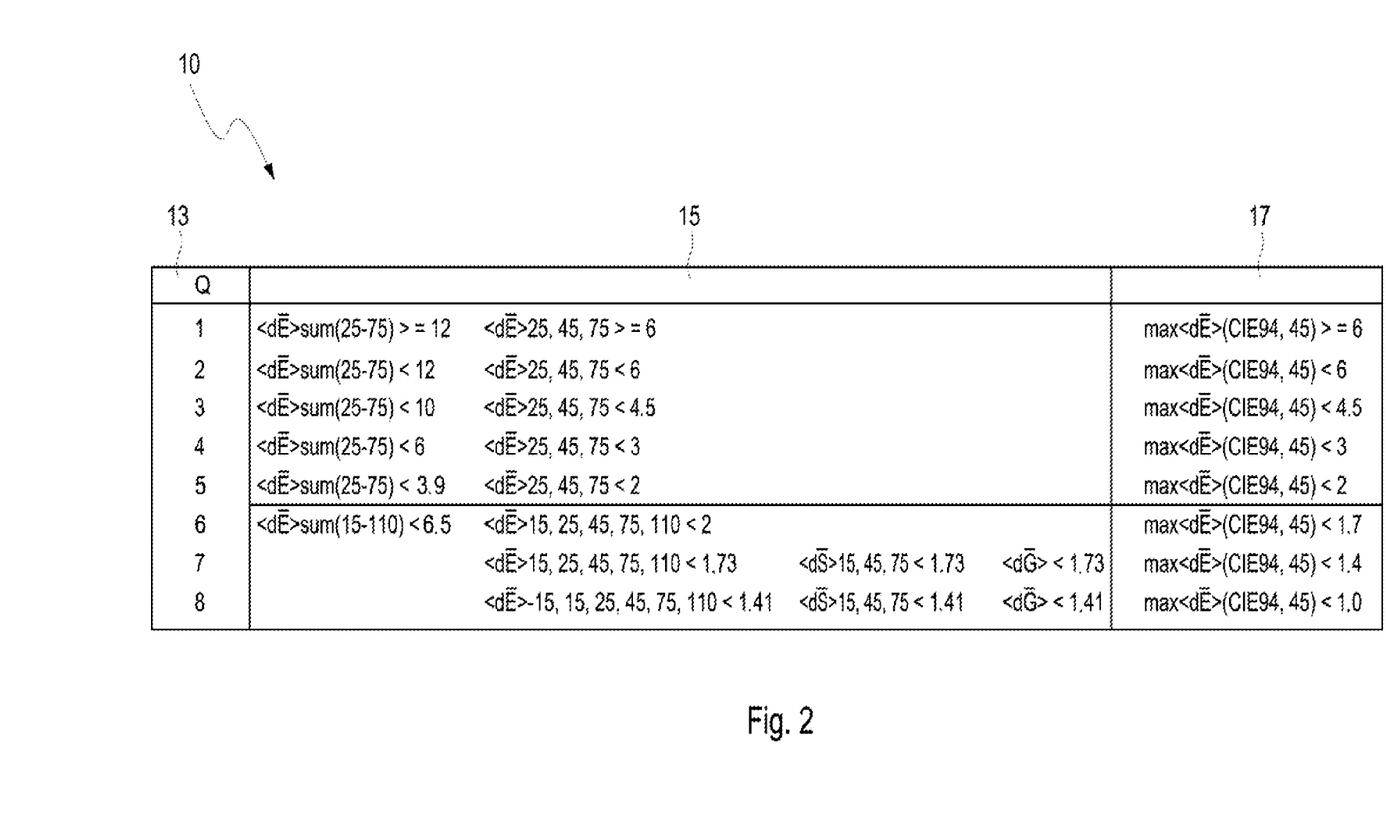
FIG. 2 shows an embodiment of a mapping prescription, provided according to the invention, for an assignment to respective scale values of an embodiment of the scale provided according to the invention.

In order to determine a BPI (batch performance indicator) color quality indicator for the coating or the respective coating batch, at least one first functional value is determined for each measurement geometry of the number of measurement geometries and each light source of the number of light sources on the basis of a mean value, or as a mean value, of purged and normalized color differences that are determined for at least one surface element OEM of a vehicle body coated by e.g. a car body maker and/or of a mean value, or as a mean value, of purged and normalized color differences that are determined for at least one surface element ASP of a car body attachment, in particular made of plastic, coated by e.g. a vehicle supplier. According to the table known from WO 2016/074801 A2 and shown in FIG. 2, the respective first functional values of the number of measurement geometries and the number of light sources, calculated for each surface element, are once again combined by calculation according to the predetermined "rating" mapping prescription and a result, emerging therefrom, is assigned by means of the "rating" mapping prescription, to be provided in advance, as emerges e.g. from the table from FIG. 2, to a value of the scale that is identical for all color quality indicators. Here, the color quality indicator BPI emerges as follows:

$$BPI_{OEM,ASP} = \text{rating}[f(\text{averaged} <dX>_{SC(OEM,ASP,purged)})], \quad (11)$$

where $<dX> = dX^*/S_x$ applies and averaged $<dX>_{SC(OEM,ASP,purged)}$ corresponds to the mean value of the color differences, which were normalized by the normalization factor SC (=batch tolerance) and purged, of a surface element OEM of a vehicle body coated e.g. by a car body maker or a surface element ASP of a car body attachment, made of plastic, coated e.g. by a vehicle supplier. Here, the normalization factor SC corresponds to a respective batch tolerance of the respectively examined batch of the coating. As a consequence, for each batch, a color quality indicator BPI arises for the surface element OEM coated with the coating of the respective batch and a color quality indicator BPI arises for the surface element ASP coated with the coating of the respective batch. Here, as a rule, a plurality of equivalent surfaces represented by the surface element are measured for the surface element OEM coated with the coating of the batch. The same applies for the surface element ASP coated with the coating of the respective batch, for which, likewise, a plurality of equivalent surfaces represented by the surface element ASP are measured as a rule. According to the predetermined mapping prescription (see table in FIG. 2), in the case of effect coatings, it is also necessary, for the assignment to relatively high scale values, i.e. to a scale value 7 or 8, not only to insert the determined, purged and normalized color differences into the color-quality-indicator-specific mathematical relationship as variables for each measurement geometry and for each light source, but also to insert the determined, purged and normalized sparkle differences and/or graininess differences. This means that <dX> in this case represents <dE> and additionally, in the case of effect coatings, <dS> and <dG>.

The color quality indicator BPI represents a color-related coating quality of the coating or of the respective coating batch.

In a further configuration of the process according to the invention, a second functional value is determined respectively for each measurement geometry and each light source for determining a color quality indicator API (alignment performance indicator), said second functional value being determined on the basis of a magnitude or absolute value, or as an absolute value, of a respective difference between a normalized color difference of a control surface element OEM_QC for the vehicle body coated by a producer of the coating or a control surface element ASP_QC for the car body attachment, in particular made of plastic, coated by the producer of the coating and a mean value of purged and normalized color differences of at least one surface element OEM of the vehicle body coated e.g. a car body maker or a mean value of purged and normalized color differences of at least one surface element ASP of the car body attachment, which, in particular, is produced from plastic, coated by e.g. a vehicle supplier. The respective second functional values of the number of measurement geometries and the number of light sources, which arise for the surface element OEM or for the surface element ASP, are once again combined by calculation, as shown in, for example, the table in FIG. 2, wherein the values arising in the process are assigned to respectively a value of the scale identical for all color quality indicators by means of the mapping prescription to be provided in advance. Here, the color quality indicator API arises as follows:

$$API_{OEM,ASP} = \text{rating } [f(ABS(<dX>_{SC(OEM\_QC,ASP\_QC)} - \text{averaged}<dX>_{SC(OEM,ASP,purged)}))] \quad (12)$$

where $<dX>=dX^*/S_x$ applies, $<dx>_{SC(OEM\_QC,\ ASP\_QC)}$ denotes a normalized color difference of a control surface element OEM_QC for the vehicle body coated by a producer of the coating or a control surface element ASP_QC for the car body attachment, which, in particular, is produced from plastic, coated by the producer of the coating and averaged $<dX>_{SC(OEM,ASP,purged)}$ denotes the mean value of the color differences, which were normalized by the normalization factor SC and purged, of a surface element OEM of a vehicle body coated by e.g. a car body maker or a surface element ASP of a car body attachment, which, in particular, is produced from plastic, coated by e.g. a vehicle supplier, and ABS represents the absolute value. Here, the color quality indicator API is determined firstly for OEM and secondly for ASP; i.e., two color quality indicators $API_{OEM}$ and $API_{ASP}$ that were determined independently from one another result, wherein the following applies:

$$API_{OEM} = \text{rating}[f(ABS(<dX>_{SC(OEM\_QC)} - \text{averaged}<dX>_{SC(OEM,purged)}))]$$

$$API_{ASP} = \text{rating}[f(ABS(<dX>_{SC(ASP\_QC)} - \text{averaged}<dX>_{SC(ASP,purged)}))]$$

In the case of effect coatings, the sparkle differences and graininess differences are taken into account in a manner analogous to the explanations relating to the color quality indicator BPI. That means that, here too, <dX> represents <dE> and optionally <dS> and <dG>.

The respective color quality indicator API represents a spray booth equalization between the producer of the coating and the customer line, i.e. the line of the car body maker or of the vehicle supplier.

In an even further configuration, a third functional value is determined respectively for each measurement geometry and each light source for the purposes of determining a CHI (color harmony index) color quality indicator, said functional value being determined on the basis of an absolute value, or as an absolute value, of a difference between a mean value of respective normalized color differences of a surface element OEM of a vehicle body coated e.g. by a car body maker and a mean value of respective normalized color differences of a surface element ASP of a car body attachment, which, in particular, is produced from plastic, coated by e.g. a vehicle supplier. The third functional values are assigned to a value of the scale that is identical for all color quality indicators by means of the mapping prescription that is to be provided in advance. Here, CHI is calculated as:

$$CHI_{OEM,ASP} = \text{rating } [f(ABS(\text{averaged}<dX>_{SC,OEM} - \text{averaged}<dX>_{SC,ASP}))] \quad (13)$$

where $<dX>=dX^*/S_x$ applies, $<dX>_{SC,OEM}$ corresponds to a color difference, normalized by the normalization factor SC, of a surface element OEM for the vehicle body coated with the coating and $<dX>_{SC,ASP}$ corresponds to a color difference, normalized by the normalization factor SC, of a surface element ASP for the car body attachment, in particular made of plastic, coated with the coating. In the case of, for example, 6 measurement geometries and one light source, 6 third functional values arise. In the case of effect coatings, 6+6 third functional values are still added for the purposes of taking into account sparkle differences and graininess differences.

Here, the colorimetric constants are respectively weighted or normalized by a batch tolerance SC that is fixedly prescribed for the batch of the coating. The color quality indicator CHI represents a mean deviation between coated surface elements from different coating stations, i.e., in particular, between a surface element of a car body coated with the coating by a car body maker and a surface element of a car body attachment, made of plastic, coated with the coating by a vehicle supplier.

According to a further embodiment of the process according to the invention, an LPI (line performance indicator) color quality indicator is determined, wherein a respective fourth functional value is determined for each measurement geometry and each light source, said fourth functional value being determined on the basis of a variance, or as a variance, of purged and normalized color differences of at least one surface element OEM of a vehicle body coated e.g. by a car body maker and/or of purged and normalized color differences of at least one surface element ASP of a car body attachment, which, in particular, is produced from plastic, coated by e.g. a vehicle supplier, and the respective fourth functional values of the number of measurement geometries and the number of light sources are once again separately combined by calculation for each surface element and the respective result arising in this case is assigned separately for each surface element to a value of the scale that is identical for all color quality indicators by means of the mapping prescription to be provided in advance. Here, the color quality indicator LPI emerges as follows:

$$LPI_{OEM,ASP} = \text{rating } [f(\tilde{\sigma} <dX>_{WLPI(OEM,ASP,purged)})] \quad (14)$$

where δ<dX> specifies the variance, WLPI represents the normalization factor with which the respective color differences or the respective colorimetric constants are to be normalized. Here, the colorimetric constants L*, a*, b*, C*, H* are each weighted as follows: L* with 1.0, a* with 0.2, b* with 0.2, C* with 0.8, H* with 0.2. These respective weighting constants are predetermined for the measurement geometries or the spectral geometries.

The color quality indicator LPI represents a process variance when coating a surface element of a line, i.e., for example, a car body attachment or a vehicle body. Different color quality indicators LPI are calculated independently and separately from one another for the various surface elements, i.e. a color quality indicator $LPI_{OEM}$ for the surface element of the vehicle body and a color quality indicator $LPI_{ASP}$ for the surface element of the car body attachment arise.

The surface element OEM of a vehicle body coated with the coating by e.g. a car body maker and the surface element ASP of a car body attachment coated with the coating by e.g. a vehicle supplier represent surface elements coated with the coating, said surface elements having been coated with the coating at different and, as a rule, mutually independent coating stations and/or having a different substrate or a different substrate material, on which the coating was applied during the coating process. Since a surface element OEM of a vehicle body coated with the coating both was generally coated at a different coating station than a surface element ASP of a car body attachment that was coated with the coating and said surface element of a vehicle body has a different substrate, these two types of surface elements are specified within the scope of the present disclosure as representing all surface elements coated with the coating which have the aforementioned differences among themselves, in particular representing a surface element OEM of a product in general coated with the coating and a surface element ASP of a product attachment coated with the coating. The same applies accordingly to the control surface elements OEM_QC and ASP_QC.

Further, the present invention relates to a computer program having program code means which are designed to perform or actuate all steps of a process described above when the computer program is executed on a computer or a corresponding computational unit.

Moreover, a system is provided for determining a plurality of different color quality indicators for a color control of a coating, wherein the system at least comprises: a spectrophotometer which is designed to ascertain, for a number of measurement geometries and a number of light sources, colorimetric coordinates of a color reference and colorimetric coordinates of the coating for a plurality of different surface elements coated with the coating and for a plurality of control surface elements coated with the coating, and a computational unit which is configured to calculate, for each measurement geometry of the number of measurement geometries and each light source of the number of light sources, respective color differences from the colorimetric coordinates of the color reference and the respective colorimetric coordinates of the coating for the plurality of surface elements coated with the coating and of control surface elements coated with the coating, to normalize the respective colorimetric coordinates with respectively one weighting factor, and to determine each of the plurality of color quality indicators by means of a mapping, defined by a predetermined mapping prescription, of functional values of a mathematical relationship between the color differences of at least one of the surface elements that is specific to the respective color quality indicator in relation to the color reference onto a value of a scale that is identical for all color quality indicators, wherein the mathematical relationship for at least one of the plurality of color quality indicators corresponds to a mathematical relationship between color differences in relation to the color reference of at least one of the surface elements and one of the control surface elements. Here, the scale may extend, for example, over an interval of integer, positive numbers from 1 to 8.

In order to take account of respective effect properties of an effect coating in the process according to the invention, provision is made for sparkle differences and graininess differences, i.e. graininess differences, which are measured by a gonio-effect-spectrophotometer, to be taken into account. To this end, respective values of the sparkle differences or the graininess differences measured by the gonio-effect-spectrophotometer are normalized and taken into account when determining a respective color quality indicator. Here, this is taken into account, in particular, in the case of an assignment to the scale values Q7 and Q8. If the color differences for the number of measurement geometries and the number of light sources respectively combined by calculation by means of the mathematical relationship that is specific for a respective color quality indicator were to be mapped from the at least one surface element onto the scale value 7 or Q7 of the predetermined scale, then further functional values in addition to these functional values calculated on the basis of the color difference are calculated on the basis of the sparkle differences <dS>, determined for the number of measurement geometries and the number of light sources, between the at least one surface element or control surface element coated with the coating and the color reference and a check is carried out as to whether these functional values calculated thus are greater than or equal to a value of 1.73 for none of the 15°, 45° and 75° measurement geometries. Furthermore, the graininess differences <dG> are determined for the number of measurement geometries and the number of light sources and calculated by means of the color-quality-indicator-specific relationship and a check is carried out as to whether these are not greater than or equal to a value of 1.73.

If the functional values calculated for the number of measurement geometries and the number of light sources respectively by means of the mathematical relationship that is specific for a respective color quality indicator were to be mapped on the basis of the color differences from the at least one surface element onto the scale value 8 or Q8 of the predetermined scale, then, in addition to these functional values, functional values are calculated on the basis of the sparkle differences and a check is carried out as to whether these are not greater than or equal to a value of 1.41 for any of the 15°, 45° and 75° measurement geometries. Furthermore, functional values are calculated on the basis of the graininess differences and a check is carried out as to whether these are not greater than or equal to a value of 1.41.

A possible configuration of the computer program according to the invention comprises, for example, the following steps:

1. Ascertaining all color coordinates for all available measurement geometries and/or all light sources or light types of a first surface element coated with the coating and a color reference in a color space.

2. Calculating respective color differences between the surface element coated with the coating and the color reference for all measurement geometries and/or all light sources.

3. Calculating respective sparkle differences and/or graininess differences for each measurement geometry if the coating to be compared is an effect coating.

4. Calculating respective color differences for at least two light types if the coating to be compared is a solid color coating.

5. Normalizing the color differences calculated in step 2 or 4 and the sparkle differences and/or graininess differences optionally calculated in step 3.

6. Repeating steps 1 to 5 for at least one second surface element coated with the coating, said at least one second surface element exhibiting a different substrate on which the coating is applied and/or having been coated at a different coating station and/or under different coating conditions in relation to the first surface element.

7. Normalizing the calculated color differences with a first tolerance value, in particular a series tolerance, and calculating the series color quality indicator CPI.

8. Purging the calculated color differences according to formula (10).

9. Respectively repeating steps 1 to 5 for respective control surface elements coated with the coating for the first surface element and the at least one second surface element.

10. Calculating the respective color quality indicators BPI, API, CHI, LPI by means of the calculated color differences and the optionally calculated sparkle differences and graininess differences and formulas (11) to (14).

Accordingly, a specific number is provided according to the invention in each case for determining a respective color quality indicator of a coating by way of exactly defined rules. The quality grades are defined by unique equations. The respective coating or respective coating batch is only assigned a specific scale value for the respective color quality indicator if all equations of a quality grade, corresponding in each case to this specific scale value, are satisfied. If not all of the criteria of a quality grade are satisfied, there is an assignment to the next lower quality grade. If not all of the quality criteria are satisfied here either, there is an assignment to the next lower quality grade in turn, etc. If not all of the quality criteria are satisfied in the second lowest quality grade, there is an assignment to the lowest quality grade. There always is an assignment to the lowest quality grade if the respective quality criteria are not satisfied for any higher quality grade.

Further advantages and configurations of the invention emerge from the description and the attached drawings.

It is understood that the features specified above and the features yet to be explained below can be used not only in the respectively specified combination but also in other combinations or on their own without departing the scope of the present invention.

The invention is illustrated schematically in the drawing on the basis of an exemplary embodiment and described in detail below with reference to the drawing.

Figure 1:
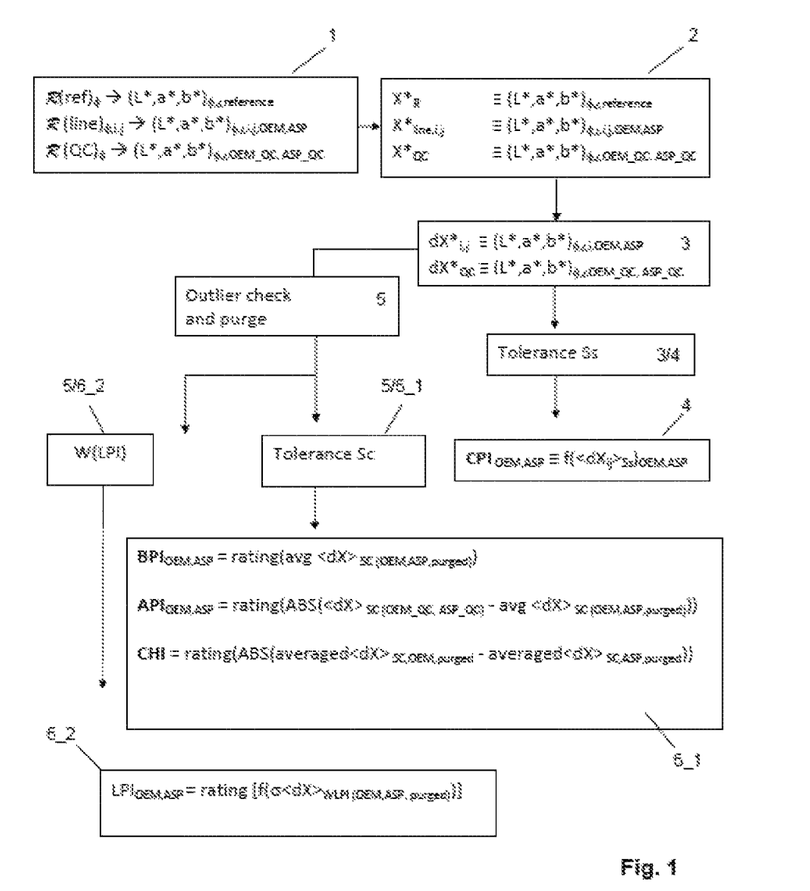
FIG. 1 shows a schematic illustration of a flowchart of a possible embodiment of the process according to the invention.

FIG. 1 shows a schematic illustration of a flowchart of an embodiment of the process according to the invention. Here, in a step 1, respective reflection values of a plurality of surface elements or control surface elements coated with the coating are initially respectively ascertained with a spectrophotometer for a number of measurement geometries and a number of light sources. Additionally, a reflection value of a color reference is also determined for the number of measurement geometries and the number of light sources. Measuring and recording the various reflection values is represented in step 1 by:

for the color reference:

$$R(\text{Ref})_\Phi \rightarrow (L^*, a^*, b^*)_{\Phi, l, reference},$$

for the respective surface elements coated with the coating during the production ("line"), for example of a vehicle, by, for example, a car body maker and/or a vehicle supplier:

$$R(\text{line})_{\Phi, i, j} \rightarrow (L^*, a^*, b^*)_{\Phi, l, i, j, OEM, ASP},$$

for respective control surface elements of the vehicle body or car body attachment made of plastic, coated by a producer of a coating:

$$R(\text{QC})_\Phi \rightarrow (L^*, a^*, b^*)_{\Phi, l, OEM\_QC, ASP\_QC}.$$

Here, i and denote the specific respective components, the surfaces of which are coated with the coating. By way of example, this may be a bumper in the case of a car body attachment or a radiator hood in the case of a car body component. Further, the car body component is denoted by OEM and the respective attachment, in particular made of plastic, is denoted by ASP. Below, the car body components or attachments, of which surface elements are respectively coated with the coating, are referred to as surface elements from the production line.

Proceeding from the ascertained reflection values, the respective colorimetric coordinates are determined both for the color reference and for the surface elements of the production line and also for the control surface elements OEM_QC, ASP_QC in a step 2.

Proceeding from the ascertained colorimetric coordinates, the color differences of the respective surface elements of the production line and the respective control surface elements for the color reference are ascertained in a step 3. Here, the respective color difference is ascertained separately for each measurement geometry of the number of measurement geometries and each light source of the number of light sources, and so, ultimately, a set of calculated color differences is available for each surface element of the production line and each control surface element, namely respectively one color difference per surface represented by the respective surface element per measurement geometry and per light source. Here, it should be noted that, as a rule, a plurality of similar surfaces are measured per surface element. Further, in the case of an effect coating, respectively one sparkle difference and one graininess difference are determined per surface per measurement geometry per light source. In a subsequent step 3/4, the ascertained color differences and, optionally, the ascertained sparkle differences and graininess differences are respectively normalized with a tolerance value Ss, wherein the tolerance value Ss is determined for a series of surfaces of a surface element in the production, i.e. from surfaces of a surface element of a series coated with the coating of a batch. That is to say, the first tolerance value Ss is determined for a series of surfaces of a surface element coated with the coating of a batch and used as a normalization factor for the color differences and, optionally, sparkle differences and graininess differences determined for the respective surfaces of the surface element from the series coated with the coating of a batch. Here, those surfaces of the surface element coated with the coating of a batch whose respective color differences and/or sparkle differences and/or graininess differences are respectively larger than the first tolerance value Ss are counted out of the series. A color quality indicator CPI is determined on the basis of the number of surfaces counted out in the process in a step 4. That is to say, the color quality indicator CPI is functionally associated, identified by "f" here in generalized fashion, with the number or the percentage of counted-out surfaces of a surface element from the surfaces of the surface element from a series coated with the coating of a batch, which do not lie in the tolerance range specified by the tolerance value Ss.

In a step 5, a predetermined statistical analysis method is performed for the color differences calculated for the surface elements of the production line and for the control surface elements and is optionally performed for sparkle differences and is optionally performed for graininess differences such that outliers can be identified and removed and, thereafter, purged respective color differences and, where applicable, sparkle differences and, where applicable, graininess differences can be provided for the respective surface elements. This means that the predetermined defined statistical analysis method acts as a test for outliers and facilitates the removal of noise from the measurements, which noise, for example, may occur during a mixing phase of two coating batches. Often, other outliers are not explainable but should be removed from a reliable color control. The respective color differences and, where applicable, sparkle differences and, where applicable, graininess differences, now purged, are likewise normalized in a step 5/6_1, to be precise using a second normalization factor Sc, which is fixedly predetermined for a coating of a batch as a batch tolerance. The color differences, now normalized and purged, and optionally the sparkle differences and graininess differences, normalized and purged, now serve to ascertain different color quality indicators, wherein each color quality indicator is based on a color-quality-indicator-specific mathematical operation, designated by "f" here in overarching fashion, of the respective color differences or sparkle differences or graininess differences of the various surface elements.

In a step 6_1, a color indicator BPI is calculated on the basis of the color differences and, where applicable, sparkle differences and, where applicable, graininess differences of the respective surface elements of the production line. Here, respectively one mean value over all color differences and, where applicable, sparkle differences and, where applicable, graininess differences of a respective surface element from the production line is ascertained for each measurement geometry and each light source. The respectively ascertained mean values for the number of measurement geometries and the number of light sources are, in turn, combined by calculation with one another in a predetermined manner, for example as specified in the table in FIG. 2, and the result emerging in the process is assigned to a value of the scale that is identical for all color quality indicators by means of the "rating" mapping prescription that should be provided in advance, wherein the assigned scale value specifies the value of the color quality indicator BPI. Here, a respective color quality indicator BPI is determined for each surface element; i.e., there is a $BPI_{OEM}$ and, determined independently thereof, a $BPI_{ASP}$ in this case.

Further, a color quality indicator API is calculated, wherein, in this case, a second functional value is determined for each measurement geometry and each light source, said second functional value being determined as an absolute value of a respective difference between a normalized color difference or a normalized sparkle difference or a normalized graininess difference of a control surface element OEM_QC of a vehicle body coated by a producer of the coating or of a control surface element ASP_QC of the car body attachment, made of plastic, coated by the producer of the coating and a mean value of purged and normalized color differences and, where applicable, sparkle differences and, where applicable, graininess differences of at least one surface element OEM of a vehicle body coated by a car body maker or a mean value of purged and normalized color differences and, where applicable, sparkle differences and, where applicable, graininess differences of at least one surface element ASP of a car body attachment, made of plastic, coated by a vehicle supplier. This means that, in the case of x measurement geometries and y light sources, x*y second functional values emerge per surface element in relation to the color differences combined with one another by calculation and optionally correspondingly many second functional values emerge in relation to the sparkle differences or graininess differences combined by calculation with one another. The second functional values of a surface element, for example combined by calculation with one another according to the table in FIG. 2, are assigned a value of the scale by means of the assignment rule or mapping prescription to be provided in advance, wherein the assigned scale value specifies the color quality indicator API for the car body component or the attachment. Here, a respective color quality indicator API is determined for each surface element; i.e., there is an $API_{OEM}$ and, determined independently thereof, an $API_{ASP}$ in this case.

Further, a color quality indicator CHI is determined, wherein respectively one third functional value is determined for each measurement geometry and each light source, said third functional value being determined as an absolute value of a respective difference between a determined and normalized color difference of at least one surface element OEM of a vehicle body coated by a car body maker and a determined and normalized color difference of at least one surface element ASP of a car body attachment, made of plastic, coated by a vehicle supplier and, where applicable, as an absolute value of a respective difference between a determined and normalized sparkle difference of OEM and a determined and normalized sparkle difference of ASP and, where applicable, as an absolute value of a respective difference between a normalized and purged graininess difference of OEM and a normalized and purged graininess difference of ASP. The third functional values arising for the number of measurement geometries and the number of light sources are combined by calculation with one another by means of predetermined calculation instructions, i.e. in accordance with the predetermined mapping prescription, like, for example, according to the table of FIG. 2, and the result emerging therefrom is likewise assigned to a value of the scale by means of the assignment rule or mapping prescription "rating" to be provided in advance and the assigned scale value corresponds to the value of the color quality indicator CHI.

As a rule, the respective scale values encompass an interval from 1 to 8 or Q1 to Q8, wherein the value 1 represents a respective worst grading and the value 8 represents a respective best grading. In addition to the three color quality indicators BPI, API and CHI, a further color quality indicator LPI may be determined in a step 6_2, proceeding from the purged color differences. In contrast to the color quality indicators BPI, API and CHI explained above, the color quality indicator LPI uses fixedly predetermined normalization constants or factors, which are set as follows for the spectral geometries:

W(LIP)=(1.0, 0.2, 0.2, 0.8, 0.2) for the weighting or normalization of the coordinates $L^*$, $a^*$, $b^*$, $C^*$, $H^*$. On the basis of the color differences weighted and purged thus in a step 5/6_2 (and on the basis of, where applicable, the sparkle differences and, where applicable, the graininess differences), the color quality indicator LPI is determined by at least one fourth functional value determined for each measurement geometry and each light type on the basis of a variance, or as a variance, of the purged and normalized color differences (and, where applicable, the sparkle differences and, where applicable, the graininess differences) of at least one surface element OEM in a vehicle body coated by a car body maker or the purged and normalized color differences (and, where applicable, the sparkle differences and, where applicable, the graininess differences) of at least one surface element ASP of a car body attachment, made of plastic, coated by a vehicle supplier. The fourth functional values arising for the number of measurement geometries and the number of light sources per surface element are combined by calculation with one another per surface element according to predetermined calculation instructions or according to the predetermined mapping prescription and the result emerging therefrom is likewise assigned to a value of the scale by means of the assignment rule or mapping prescription to be provided in advance, wherein the scale value specifies the value of the color quality indicator LPI for the car body or the car body attachment. The color quality indicator LPI is likewise determined separately for car body and respective car body component.

The color quality indicators LPI, BPI, API and CHI, when assigning the respective color-quality-indicator-specific functional values to a scale value of the scale identical for all color quality indicators, are based on the same mapping prescription, like, for example, on the mapping prescription emerging from the table in FIG. 2.

FIG. 2 illustrates a table 10 with three columns 13, 15 and 17. The first column 13 specifies scale values Q which span a grade scale from 1 to 8, wherein 1 specifies the worst quality and 8 specifies the best quality.

In accordance with the mapping prescription stated above, column 15 specifies assignment rules for the color-quality-indicator-specific functional values, respectively calculated for the number of measurement geometries and for the number of light sources, for a respective scale value Q in the form of specific unique equations. Since a type of color difference or sparkle difference or graininess difference always emerges for all color quality indicators on the basis of the mathematical relationships respectively assigned thereto as respective functional values, these color differences or sparkle differences or graininess differences emerging for each color quality indicator in a different manner, namely depending on the respective color-quality-indicator-specific mathematical relationship are denoted in the table of FIG. 2 and in the following associated description in an overarching manner by $<d\overline{E}>$ or $<d\overline{S}>$ or $<d\overline{G}>$. In order to be assigned to a specific scale value, at least four and at most ten conditions should be satisfied, respectively defined by a specific equation. Here, the term "equation" should be interpreted broadly, namely comprise both an "equation" in the narrower sense as a statement about the equality of two terms and an "inequality" as a size comparison between two terms.

That is to say, in order that a respective color quality indicator of the plurality of color quality indicators is assigned to a certain scale value for the considered coating, the color-quality-indicator-specific functional values previously calculated for the coating have to meet the conditions set by the predetermined "rating" mapping prescription for the specific scale value.

By way of example, line 1, column 15 determines that, if a sum of all color differences, calculated by means of a respective color-indicator-specific mathematical relationship (with the term "color difference" being understood as having the meaning elucidated in the preceding paragraph), for measurement geometries between 25° and 75°, i.e. for the measurement geometry having a measurement angle of 25°, for the measurement geometry having a measurement angle of 45° and for the measurement geometry having a measurement angle of 75°, i.e.

$$\sum_{25}^{75} <d\overline{E}>$$

(or phrased differently: $<d\overline{E}>$ sum (25-75)), is greater than or equal to a value of 12 and each individual color difference $<d\overline{E}>$ of the 25°, 45° and 75° measurement geometries, when considered on their own, is greater than or equal to a value of 6, the scale value 1 is assigned to the respective coating for the respective color quality indicator, which is an assigned to the respective mathematical relationship underlying the employed color differences, i.e. the respective color quality indicator has the scale value. Since the scale value 1 represents the lowest quality grade here, there also is an assignment to the scale value Q=1 if, for example, the sum of all correspondingly calculated color differences for measurement geometries between 25° and 75°, i.e.

$$\sum_{25}^{75} <d\overline{E}>,$$

is greater than or equal to 12 but, for example, the calculated color difference for one measurement geometry of the 25°, 45° and 75° measurement geometries is less than 6 when considered on its own in each case.

Here, as a rule, the sum $$\sum_{25}^{75} <d\overline{E}>$$

corresponds to a summation of the calculated color differences for the individual 25°, 45° and 75° measurement geometries, i.e. having a respective measurement angle of 25°, 45° and 75°. Accordingly, $$\sum_{15}^{110} <d\overline{E}>$$

corresponds to a summation of the calculated color differences for the individual 15°, 25°, 45°, 75° and 110° measurement geometries, i.e. for measurement angles of 15°, 25°, 45°, 75° and 110°.

In the case of all higher quality grades or scale values, i.e. Q=2, 3, 4, 5, 6, 7 and 8, it is necessary, in each case, for all quality criteria or equations, which are assigned to the respective quality grades or scale values, to be satisfied by the calculated color differences <dE> and, in the case of Q=7 or Q=8, additionally by the calculated sparkle differences <dS> and graininess differences <dG> so that a corresponding color quality indicator for the underlying coating or coating batch obtains a respective quality grade or a corresponding characteristic or a corresponding scale value Q=2, 3, 4, 5, 6, 7 or 8. Here, the notation <dE>15, 25, 45, 75, 110 means a consideration of all color differences calculated for the respective color quality indicator according to the mathematical relationship assigned to the respective color quality indicator, for a measurement angle of 15°, a measurement angle of 25°, a measurement angle of 45°, a measurement angle of 75° and a measurement angle of 110°. Accordingly, <dS> 15, 45, 75 means a consideration of all sparkle differences calculated according to the mathematical relationship assigned to the respective color quality indicator, for a measurement angle of 15°, a measurement angle of 45° and a measurement angle of 75°.

Since sparkle differences and graininess differences should also be taken into account in the case of effect coatings, provision is made for tighter, i.e. additional, conditions to apply, particularly in the case of high characteristics corresponding to a high quality. This means that, for example, in order to satisfy respective criteria for an assignment to the scale value Q with a value of 7, no color difference <dE>, in each case calculated for measurement geometries of between 15° and 110°, may have a value greater than or equal to 1.73 for a respective effect coating. Accordingly, each color difference <dE> calculated for the 15°, 25°, 45°, 75° and 110° measurement geometries on the basis of a respective color-quality-indicator-specific relationship must be less than 1.73. Additionally, a sparkle difference <dS> calculated on the basis of a respective color-quality-indicator-specific relationship must not be greater than or equal to a value of 1.73 for any of the 15°, 45° and 75° measurement geometries. Furthermore, a graininess difference <dG> calculated on the basis of a respective color-quality-indicator-specific relationship must not be greater than or equal to a value of 1.73.

Since solid coatings often have a metamerism effect, i.e. exhibit a different color or grayscale value upon illumination with different light types, dedicated assignment rules are provided for solid coatings, as illustrated in column 17.

In order to assign a respective color quality indicator for a solid coating to a respective scale value Q, there is a calculation of a maximum value of a color difference <dE> or of a grayscale difference calculated according to the mathematical relationship assigned to the color quality indicator and measured in each case under different light types, for example under the light type D64 and the light type TL84 for a measurement geometry of e.g. 45° in each case. This means that, for example, a scale value Q of 1 is assigned to a respective color quality indicator for the solid coating if the color difference <dE> calculated on the basis of the respective color-quality-indicator-specific mathematical relationship has a maximum value of greater than or equal to a value of 6 under the light types D64 and TL84.

For an assignment to other scale values Q, corresponding criteria are defined in columns 15 (for effect coatings) and 17 (for solid coatings) of table 10.

By way of example, the following applies in the case of solid-color coatings: if the maximum value of the color difference <dE> is less than 6 but greater than or equal to 4.5, the respective color quality indicator obtains the value of 2; if the maximum value of the color difference <dE> is less than 4.5 but greater than or equal to 3, the respective color quality indicator obtains the value of 3; if the maximum value of the color difference <dE> is less than 3 but greater than or equal to 2, the respective color quality indicator obtains the value of 4; if the maximum value of the color difference <dE> is less than 2 but greater than or equal to 1.7, the respective color quality indicator obtains the value of 5; if the maximum value of the color difference <dE> is less than 1.7 but greater than or equal to 1.4, the respective color quality indicator obtains the value of 6; if the maximum value of the color difference <dE> is less than 1.4 but greater than or equal to 1.0, the respective color quality indicator obtains the value of 7; if the maximum value of the color difference <dE> is less than 1.0, the respective color quality indicator obtains the value of 8.

The invention claimed is:

1. A process for determining a plurality of different color quality indicators for controlling a color of a coating, the process comprising:

ascertaining colorimetric coordinates of a color reference and colorimetric coordinates of the coating for a plurality of different surface elements coated with the coating and control surface elements coated with the coating, in each case with a spectrophotometer for one or more measurement geometries and one or more light sources; and calculating, for each measurement geometry of the one or more measurement geometries and each light source of the one or more light sources, respective color differences from the colorimetric coordinates of the color reference and the respective colorimetric coordinates of the coating for the plurality of the surface elements coated with the coating and of the control surface elements coated with the coating;

wherein the respective colorimetric coordinates are normalized with respectively one weighting factor;

wherein each of the plurality of color quality indicators is determined by means of a mapping, defined by a predetermined mapping prescription which is identical for all color quality indicators, of functional values onto a scale value of a predetermined scale which is identical for all color quality indicators;

said functional values being determined in each case for the one or more measurement geometries and the one or more light sources by means of a mathematical relationship, specific to the respective color quality indicator, between color differences of at least one of the surface elements in relation to the color reference;

wherein the mathematical relationship for at least one of the color quality indicators corresponds to a mathematical relationship between color differences in relation to the color reference of at least one of the surface elements and one of the control surface elements.

2. The process as claimed in claim 1, wherein the color differences for the coating are calculated depending on a chromaticity of the coating using the following respective color difference formulas:

$$<dE>=(<dL>^2+<da>^2+<db>^2)^{1/2} \qquad \text{achromatic region}$$

$$<dE>=(<dL>^2+<dC>^2<dH>^2)^{1/2}, \qquad \text{chromatic region}$$

where <dE> denotes a normalized color difference, <dL>=dL*/$S_L$ denotes a normalized lightness with lightness L* and normalization factor $S_L$, <da>=da*/$S_a$, <db>=db*/$S_b$ denote normalized color values with color values a*, b* and normalization factors $S_a$, $S_b$, <dC>=dC*/$S_C$ denotes a normalized chroma with chroma C* and normalization factor $S_C$ and <dH>=dH/$S_H$ denotes a normalized hue angle with hue angle H* and normalization factor $S_H$, wherein the normalization factors are chosen depending on the coating and/or the respective measurement geometry and/or a respective condition of a substrate on which the coating should be applied in order to provide a respective surface element coated with the coating.

3. The process as claimed in claim 1, wherein the plurality of surface elements coated with the coating at least comprise: a surface element representing parts of a product (denoted by OEM) of a vehicle body coated by a car body maker, a surface element representing attachments for the product (denoted by ASP) of a car body attachment, made of plastic and coated by a vehicle supplier; and the plurality of control surface elements coated with the coating comprises at least: a control surface element for parts of a product (abbreviated OEM_QC) for the vehicle body coated by a producer of the coating, a control surface element for an attachment of the product (abbreviated ASP_QC) for the car body attachment, made of plastic, coated by the producer of the coating.

4. The process as claimed in claim 1, wherein the respective colorimetric coordinates are determined in each case on the basis of respective reflection values of the color reference and the plurality of coated surface elements or of control surface elements.

5. The process as claimed in claim 1, wherein the respective color differences are normalized with one of two different tolerance values, depending on the color quality indicator to be determined, wherein a first tolerance value is determined for a series of surface elements coated with the coating of one batch and a second tolerance value is fixedly predetermined as batch tolerance for the batch of the coating, wherein the first tolerance value emerges from multiplying the second tolerance value by a factor g, where the factor g is determined by a DIN 6175-2 standard.

6. The process as claimed in claim 5, wherein those of the surface elements of the series coated with the coating of a batch, whose respective color differences are greater than the first tolerance value in each case, are counted and removed and a series color quality indicator CPI is determined on the basis of the counted number of removed surface elements in relation to an overall number of the surface elements of the series coated with the coating of the batch, wherein the portion of sorted-out surface elements is assigned to a scale value of the predetermined scale according to a predetermined assignment prescription, wherein the scale value specifies the value of the series color quality indicator CPI.

7. The process as claimed in claim 1, wherein the number of measurement geometries at least comprises: respectively one measurement arrangement with a 45° illumination and a measurement angle of −15°, 15°, 25°, 45°, 75° and 110° and/or respectively one measurement arrangement with a measurement angle of 90° and a 15° illumination, 45° illumination, 75° illumination and diffuse illumination.

8. The process as claimed in claim 1, wherein a predetermined statistical analysis process is performed on respective color differences determined for a series of surface elements coated with the coating of a batch, outliers are removed and purged respective color differences are provided.

9. The process as claimed in claim 8, wherein, for the purposes of determining a color quality indicator, batch performance indicator (BPI), of the plurality of color quality indicators for the number of measurement geometries and the number of light sources, respectively one first functional value is determined as a mean value of purged and normalized color differences of at least one surface element representing parts of a product (denoted by OEM) of a vehicle body coated by a car body maker and/or as a mean value of purged and normalized color differences of at least one surface element representing attachments for the product (denoted by ASP) of a car body attachment, made of plastic and coated by a vehicle supplier, and a scale value of the scale is assigned to the respective first functional values determined for each surface element by means of the predetermined mapping prescription.

10. The process as claimed in claim 8, wherein, for the purposes of determining a color quality indicator, alignment performance indicator (API), of the plurality of color quality indicators for the number of measurement geometries and the number of light sources, respectively one second functional value is determined as an absolute value of a difference between a normalized color difference of a control surface element for parts of a product (abbreviated OEM_QC) for the vehicle body coated by a producer of the coating or a control surface element for an attachment of the product (abbreviated ASP_QC) for the car body attachment, made of plastic, coated by the producer of the coating and a mean value of purged and normalized color differences of at least one surface element OEM of the vehicle body coated by a car body maker or a mean value of purged and normalized color differences of at least one surface element ASP of the car body attachment, made of plastic and coated by a vehicle supplier, and respectively one scale value of the scale is assigned to the respective second functional values determined for each surface element by means of the predetermined mapping prescription.

11. The process as claimed in claim 8, wherein, for the purposes of determining a color quality indicator, color harmony index (CHI), of the plurality of color quality indicators for the number of measurement geometries and the number of light sources, respectively one third functional value is determined as absolute value of a difference between a mean value of purged and normalized color differences of at least one surface element representing parts of a product (denoted by OEM) of a vehicle body coated by a car body maker and a mean value of purged and normalized color differences of a surface element representing attachments for the product (denoted by ASP) of a car body attachment, made of plastic, coated by a vehicle supplier, and a scale value of the scale is assigned to the third functional values by means of the predetermined mapping prescription.

12. The process as claimed in claim 9, wherein the colorimetric constants are respectively weighted with a batch tolerance that is fixedly predetermined for the batch of the coating.

13. The process as claimed in claim 8, wherein, for the purposes of determining a color quality indicator, line performance indicator (LPI) of the plurality of color quality indicators for the number of measurement geometries and the number of light sources, respectively one fourth functional value is determined as a variance of purged and normalized color differences of a surface element representing parts of a product (denoted by OEM) of a vehicle body coated by a car body maker or of purged and normalized color differences of a surface element representing attachments for the product (denoted by ASP) of a car body attachment, made of plastic and coated by a vehicle supplier, and a scale value of the scale is assigned to the respective fourth functional values determined for each surface element by means of the predetermined mapping prescription.

14. The process as claimed in claim 13, wherein the colorimetric constants L*, a*, b*, C*, H* are respectively weighted as follows: L* with 1.0, a* with 0.2, b* with 0.2, C* with 0.8, H* with 0.2.

15. A non-transitory computer-readable medium that includes computer-executable instructions for execution by a computing device comprising at least one processor in communication with at least one memory device, wherein when executed by the computing device, the computer-executable instructions cause the computing device to perform the process as claimed in claim 1.

16. A system for determining a plurality of different color quality indicators for a color control of a coating, the system including a spectrophotometer to ascertain, for one or more measurement geometries and one or more light sources, colorimetric coordinates of a color reference and colorimetric coordinates of the coating for a plurality of different surface elements coated with the coating and control surface elements coated with the coating;

a computing device which is configured to calculate, for each measurement geometry of the one or more measurement geometries and each light source of the one or more light sources, respective color differences from the colorimetric coordinates of the color reference and the respective colorimetric coordinates of the coating for the plurality of surface elements coated with the coating and of the control surface elements coated with the coating;

the calculation including:
  (i) normalizing the respective colorimetric coordinates with respectively one weighting factor;
  (ii) determining color-quality-indicator-specific functional values for the one or more measurement geometries and the one or more light sources, respectively by means of a mathematical relationship, specific to a respective color quality indicator, between color differences in relation to the color reference of at least one of the surface elements; and
  (iii) determining each of the plurality of color quality indicators by means of a mapping, defined by a predetermined mapping prescription which is identical for all color quality indicators, of the color-quality-indicator-specific functional values onto a scale value of a predetermined scale which is identical for all color quality indicators;

said functional values having been determined for the one or more measurement geometries and the one or more light sources, in each case by means of the mathematical relationship, specific for the respective color quality indicator, between color differences in relation to the color reference of at least one of the surface elements;

wherein the mathematical relationship for at least one of the plurality of color quality indicators corresponds to a mathematical relationship between color differences in relation to the color reference of at least one of the surface elements and one of the control surface elements.

* * * * *